United States Patent
Moon et al.

(10) Patent No.: US 7,401,168 B2
(45) Date of Patent: Jul. 15, 2008

(54) METHOD AND APPARATUS FOR COMMUNICATION VIA SERIAL MULTI-PORT, AND RECORDING MEDIUM

(75) Inventors: Sung-uk Moon, Gumi-si (KR); Jeong-cheol Choi, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 404 days.

(21) Appl. No.: 10/845,116

(22) Filed: May 14, 2004

(65) Prior Publication Data

US 2004/0230711 A1 Nov. 18, 2004

(30) Foreign Application Priority Data

May 15, 2003 (KR) .................. 10-2003-0030894

(51) Int. Cl.
*G06F 3/00* (2006.01)
*G06F 5/00* (2006.01)
*G06F 13/28* (2006.01)

(52) U.S. Cl. ............................. 710/38; 710/36; 710/8; 710/2; 710/300

(58) Field of Classification Search .............. 710/38
See application file for complete search history.

(56) References Cited

U.S. PATENT DOCUMENTS

| | | | |
|---|---|---|---|
| 4,866,667 A * | 9/1989 | Shimada ..................... | 710/316 |
| 4,888,549 A | 12/1989 | Wilson et al. | |
| 5,214,785 A * | 5/1993 | Fairweather ................. | 710/67 |
| 5,442,305 A | 8/1995 | Martin et al. | |
| 5,619,722 A * | 4/1997 | Lovrenich .................... | 710/2 |
| 5,644,705 A | 7/1997 | Stanley | |
| 5,819,112 A * | 10/1998 | Kusters ........................ | 710/36 |
| 5,835,703 A * | 11/1998 | Konno .......................... | 714/42 |
| 5,875,293 A | 2/1999 | Bell et al. | |
| 5,903,572 A | 5/1999 | Wright et al. | |
| 6,035,345 A * | 3/2000 | Lee .............................. | 710/8 |
| 6,169,413 B1 | 1/2001 | Paek et al. | |

(Continued)

FOREIGN PATENT DOCUMENTS

JP 63-9337 1/1988

(Continued)

OTHER PUBLICATIONS

U.S. Appl. No. 10/845,115, filed May 14, 2004 Min-Won Bae, et al., Samsung Electronics, Co., Ltd., Suwon-si, Republic of Korea.

(Continued)

*Primary Examiner*—Alford Kindred
*Assistant Examiner*—Brooke J Dews
(74) *Attorney, Agent, or Firm*—Staas & Halsey LLP

(57) ABSTRACT

A multi-port apparatus used to communicably connect a computer and a plurality of apparatuses connected to the computer through the computer serial communication ports, such as two computer serial communication ports. A second serial communication port of the computer is connectable to ports corresponding to the plurality of apparatuses desired to be communicated with. A changeover switch is controlled through a first serial communication port of the computer to select one of the plurality of the apparatuses to connect with the second serial communication port of the computer and communicating with the one apparatus through the second serial communication port.

14 Claims, 5 Drawing Sheets

U.S. PATENT DOCUMENTS

| | | | |
|---|---|---|---|
| 6,208,477 B1 | 3/2001 | Cloke et al. | |
| 6,317,798 B1 | 11/2001 | Graf | |
| 6,330,246 B1 * | 12/2001 | Denning et al. | 370/438 |
| 6,434,498 B1 | 8/2002 | Ulrich et al. | |
| 6,434,499 B1 | 8/2002 | Ulrich et al. | |
| 6,516,053 B1 | 2/2003 | Ryan et al. | |
| 6,806,700 B2 | 10/2004 | Wanek et al. | |
| 6,850,994 B2 | 2/2005 | Gabryjelski | |
| 6,952,789 B1 * | 10/2005 | Azim et al. | 713/400 |
| 6,971,084 B2 | 11/2005 | Grey et al. | |
| 7,219,028 B2 * | 5/2007 | Bae et al. | 702/115 |

FOREIGN PATENT DOCUMENTS

| | | |
|---|---|---|
| JP | 60-005646 | 1/1989 |
| JP | 1-222549 | 9/1989 |
| JP | 3-209601 | 9/1991 |
| JP | 8-298689 | 11/1996 |
| JP | 2000-215116 | 8/2000 |
| JP | 2002-21555 | 8/2002 |
| KR | 1997-7634 | 2/1997 |
| KR | 1997-76738 | 12/1997 |
| KR | 1998-35445 | 8/1998 |
| KR | 1998-47465 | 9/1998 |
| KR | 1998-31599 | 7/1999 |
| KR | 1999-60610 | 7/1999 |
| KR | 1999-60619 | 7/1999 |
| KR | 1999-65516 | 8/1999 |
| KR | 1999-70583 | 9/1999 |
| KR | U2000-0012526 | 7/2000 |
| KR | 2001-0049089 | 6/2001 |

OTHER PUBLICATIONS

U.S. Appl. No. 10/845,152, filed May 14, 2004, Chang-ick Shin, Samsung Electronics, Co., Ltd., Suwon-si, Republic of Korea.

Mark Nelson, "Serial Communications Developer's Guide", $2^{nd}$ Edition, 5 pages (copyrighted material).

Notice of Office Action issued by the Korean Patent Office on Nov. 30, 2004 in a Korean patent application No. 10-2003-0030895 related to the present above-identified US patent application (2 pages), including English language translation thereof (2 pages).

Notice of Office Action issued by the Korean Patent Office on Feb. 22, 2005 in a Korean patent application No. 10-2003-0030894 related to the present above-identified US patent application (2 pages), including English language translation thereof (2 pages).

* cited by examiner

Prior Art

FIG. 4

| DLE | STX | PORT NUM3 (10²) | PORT NUM2 (10) | PORT NUM1 (1) | CHECKSUM | ETX |

DLE:0x10
STX:0x02    CHECKSUM : (PORTNUM3) XOR(PORTNUM2) XOR(PORTNUM1)
ETX:0x03

METHOD AND APPARATUS FOR COMMUNICATION VIA SERIAL MULTI-PORT, AND RECORDING MEDIUM

CROSS-REFERENCE TO RELATED APPLICATIONS

This application claims priority benefit of Korean Patent Application No. 2003-30894, filed on May 15, 2003, in the Korean Intellectual Property Office, the disclosure of which is incorporated herein in its entirety by reference.

BACKGROUND OF THE INVENTION

1. Field of the Invention

The present invention relates to a multi-port apparatus (device) used to control a plurality of apparatuses through serial communication ports, and more particularly, to a serial multi-port communication method for communications with a plurality of apparatuses through two serial communication ports mounted in a computer, an apparatus suitable to the method, a method for controlling this apparatus and a recording medium suitable to this control method.

2. Description of the Related Art

As is well-known, an IBM compatible computer provides two standard serial communication ports (COM1, COM2), but in some applications, more ports may be needed. In order to satisfy this demand, multi-port devices have been developed and these multi-port devices usually support 6-8 universal asynchronous receiver-transmitter (UART) ports.

The related art regarding these multi-port devices is broadly explained in 'SERIAL COMMUNICATIONS Developer's Guide 2nd Edition', IDG BOOK, pp.25-26, and also is disclosed in U.S. Pat. No. 4,866,667 (laid open Sep. 12, 1989), U.S. Pat. No. 4,868,784, and JP 2002-215555.

FIG. 1 is a block diagram showing the structure of a related art multi-port board. The apparatus shown in FIG. 1 is mounted into an industry standard architecture (ISA) slot, or a peripheral component interconnect (PCI) slot of a computer, and is used after being connected to a PCI/ISA bus 102.

In the apparatus shown in FIG. 1, a UART controller 104 which converts parallel data into a serial signal is installed in each port (ports 1 through 4) for providing serial communications. With the UART controllers 104, the apparatus of FIG. 1 comprises an interrupt management unit 106 which arbitrates interrupts from these UART controllers 104, and a data switching unit 108 which enables to read data from and write data in the registers of the UART controllers selectively.

Each UART controller 104 independently generates an interrupt signal for requesting service. Once an interrupt is generated, the interrupt management unit 106 sends this interrupt to a central processing unit (CPU, not shown) through the PCI/ISA bus without distinguishing the source UART controller 104 of the interrupt. In the CPU of the computer, one interrupt request (IRQ) is allocated to the multi-port board shown in FIG. 1 (not to each of the ports), and driver software installed in the computer distinguishes which port requests interrupt service.

If an interrupt is generated, the interrupt service routine of the driver software confirms the content of a status register installed in each UART controller 104, by switching each UART controller 104 with the data switching unit 108, and provides data transmission or reception service for a port, if based upon the port status register, that the port needs the data transmission/reception service.

That is, the interrupt service routine reads data from a Received Holding register installed in a UART controller 104 whose Data Received flag is set, because the UART controller 104 received data through an RX signal line, and for a UART controller 104 which finishes data output to a TX signal line, loads data to be transmitted next on a Transmit Holding register installed in the UART controller 104. If there is not other UART controller 104 that needs service, the interrupt service routine is finished.

Since this related art multi-port device is usually constructed to have a shape to be inserted into an ISA slot or a PCI slot of a computer, the related art multi-port device has an inconvenience of requiring opening the case of a personal computer (PC) when detaching the device from the ISA/PCI slot of the computer, for example, for maintenance, for adding more multi-port slot cards, removing multi-port slot cards, etc., and needs a complex hardware design to comply with ISA/PCI bus standards of the computer. In addition, when it is designed to support a plurality of ports, due to the narrow inside space of a computer, the number of ports that can be accommodated is limited, such that it is inevitable to separately provide another slot mounting board for more external ports.

Furthermore, the related art multi-port device needs a separate interrupt management unit 106 for arbitrating interrupts generated in ports, and whenever a port is added, a UART controller should also be added, such that cost of manufacturing increases.

Furthermore, the related art multi-port device needs installation of a separate driver software for each provided port for controlling the devices via the ports and an engineer who develops an application program for controlling a plurality of apparatuses by using the software should have a thorough knowledge on the method of using the driver software, which causes inconvenience in distribution and usage of the device.

SUMMARY OF THE INVENTION

The present invention provides a serial multi-port control method by using two serial communication ports that are basically provided with a computer to easily control a plurality of (three or more) apparatuses. The present invention also provides a serial communication multi-port apparatus (device) providing three or more communication ports via two standard UART serial communication ports of the computer. The present invention also provides a recording medium storing at least one program controlling a multi-port device according to the present invention.

Additional aspects and/or advantages of the invention will be set forth in part in the description which follows and, in part, will be obvious from the description, or may be learned by practice of the invention.

The present invention may be achieved by a method of communicably connecting a computer and a plurality of apparatuses through a serial communication port, comprising connecting a second serial communication port of the computer to a port corresponding to an apparatus desired to be communicated with; controlling a changeover switch through a first serial communication port of the computer; and communicating with the apparatus desired to be communicated with through the second serial communication port according to a control of the changeover switch through the first serial communication port.

The present invention may also be achieved by a serial communication multi-port apparatus communicably connecting a computer and a plurality of apparatuses through a serial communication port, the apparatus comprising a first connection unit and a second connection unit that are connected to a first serial communication port and a second serial communication port, respectively, of the computer; a plurality of output ports corresponding to the plurality of apparatuses; a changeover switch which selectively switches the second connection unit to the output ports; and a channel control unit which is connected to the first connection unit and controls the switching operation of the changeover switch.

The present invention may also be achieved by a method of controlling multi-port communication apparatus which comprises a first connection unit and a second connection unit that are connected to a first serial communication port and a second serial communication port, respectively, of a computer; a plurality of output ports corresponding to a plurality of apparatuses; a changeover switch which selectively switches the second connection unit to the output ports; and a channel control unit which is connected to the first connection unit and controls the switching operation of the changeover switch, and connects the computer and the plurality of apparatuses for communications, the method comprising if operation power is provided to the apparatus, adjusting the communication speed and method of the channel control unit to those of the computer; receiving a channel exchange command from the computer through the first connection unit; controlling the changeover switch according to the received command; and transmitting by the channel control unit a response signal indicating that switching is successfully performed, to the computer through the first connection unit.

The present invention may also be achieved by a computer readable recording medium having stored thereon a program controlling an apparatus, which comprises a first connection unit and a second connection unit that are connected to a first serial communication port and a second serial communication port, respectively, of a computer; a plurality of output ports corresponding to a plurality of apparatuses; a changeover switch which selectively switches the second connection unit to the output ports; and a channel control unit which is connected to the first connection unit and controls the switching operation of the changeover switch, and connects the computer and the plurality of apparatuses for communications, according to a method comprising if operation power is provided to the apparatus, adjusting the communication speed and method of the channel control unit to those of the computer; receiving a channel exchange command from the computer through the first connection unit; controlling the changeover switch according to the received command; and transmitting by the channel control unit a response signal indicating that switching is successfully performed, to the computer through the first connection unit.

BRIEF DESCRIPTION OF THE DRAWINGS

The above and/or other aspects and advantages of the present invention will become more apparent by describing in detail embodiments thereof with reference to the attached drawings in which:

FIG. 4 is a diagram showing a structure of a channel select command packet used in the apparatus of FIG. 3, according to an embodiment of the present invention.

DETAILED DESCRIPTION OF THE PREFERRED EMBODIMENTS

Figure 1:
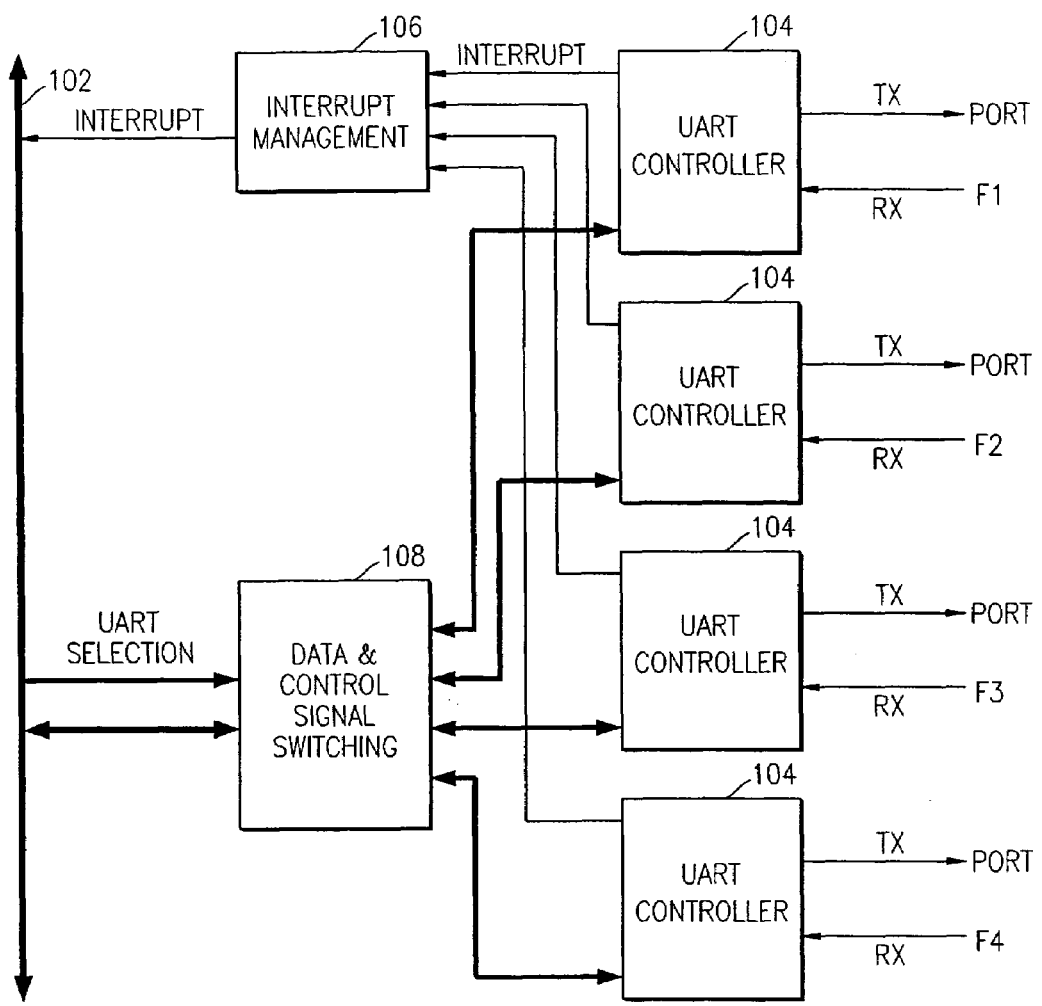
FIG. 1 is a block diagram showing the structure of a related art multi-port apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
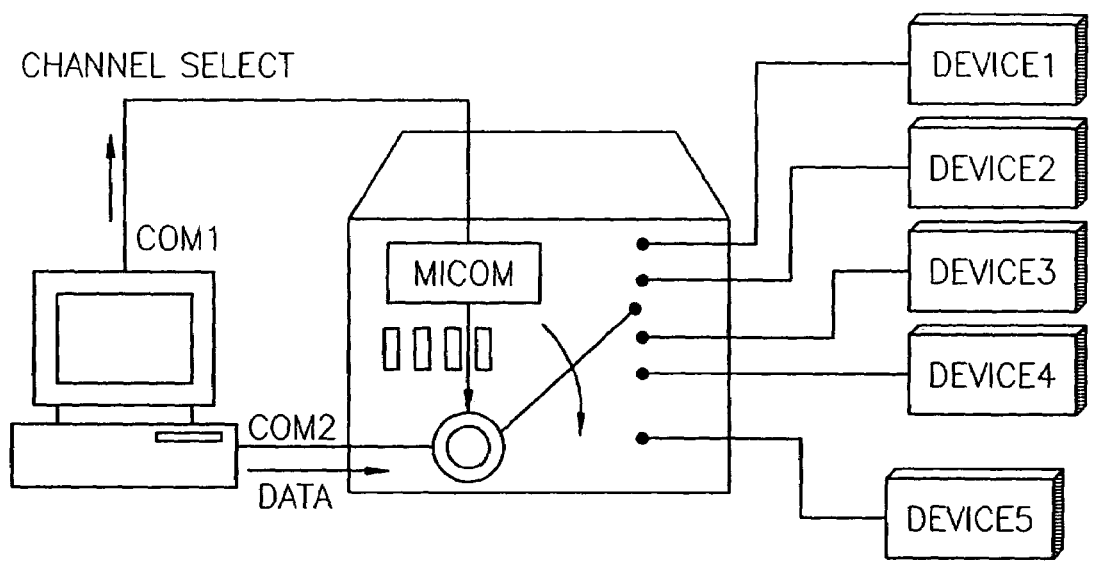
FIG. 2 is a schematic diagram of a computer having two serial communication ports and communicably connectable with a plurality of devices via a serial communication multi-port apparatus, according to an embodiment of the present invention.

FIG. 2 is a schematic diagram of a computer having two serial communication ports and communicably connectable with a plurality of devices via a serial communication multi-port apparatus, according to an embodiment of the present invention. As shown in FIG. 2, the serial multi-port communication method according to an embodiment of the present invention communicably connects one host computer 200 with a plurality of peripheral devices 1-5 by controlling, via a first serial communication signal provided from a first serial communication port (COM1), a changeover switch selectively controlling exchange of a second serial communication signal via a second serial communication port (COM2) with one of the plurality of devices.

More particularly, the second serial communication port is connected to a plurality of peripheral apparatuses through a changeover switch, and a channel control unit (a channel controller) controls the switching operation of the changeover switch via the first serial communication port. Through the first serial communication port, a channel exchange (select) command is provided to the channel control unit from the computer. The channel exchange command complies with a predetermined protocol, and includes information indicating a peripheral apparatus that desires to communicate with the computer. Advantageously, using the protocol between a computer application, driver, and/or operations system software and a channel controller via the first serial communication port, increases the reliability of channel switching. According to an aspect of the present invention, the computer may receive a confirmation response after channel switching is enabled (successful).

The channel control unit receives the channel exchange command from the computer, extracts information indicating a peripheral apparatus desiring communications from the command, and according to this extracted information, controls the switching operation of the changeover switch. In addition, typically, the channel control unit determines whether the channel exchange command is normally executed, and the channel control unit provides the determination result to the computer through the first serial communication port. The computer receives the response signal provided by the channel control unit, and confirms whether the channel control unit normally executed the channel exchange command.

If the computer confirms that the channel control unit normally (successfully) executed the channel exchange command, the computer communicates with a peripheral apparatus desired to be controlled (communicate with) through the second serial communication port according to a control of the changeover switch by the channel control unit. Therefore, according to the serial multi-port communication method explained by referring to FIG. 2, communications between a computer and a plurality of apparatuses using two serial communication ports that are generally provided with the computer can be easily controlled. A method of testing peripheral devices via their serial ports using the multi-port serial communication switch of the present invention, is disclosed in the related Korean Patent Application No. 2003-30893 filed May 15, 2003 by Samsung Electronics Co., Ltd., assignee of the present Application, and also disclosed in a co-pending U.S. patent application filed by Samsung Electronics Co., Ltd., assignee of the present Application, on May 14, 2004 in the US Patent and Trademark Office, the entire contents of which are hereby incorporated by reference. Further, a device testing apparatus using only one host computer, without using test computers, is disclosed in the related Korean Patent Application No. 2003-30895 filed May 15, 2003 by Samsung Electronics Co., Ltd., assignee of the present Application, and also disclosed in a co-pending US patent application filed by Samsung Electronics Co., Ltd., assignee of the present Application, on May 14, 2004 in the U.S. Patent and Trademark Office, the entire contents of which are hereby incorporated by reference.

Figure 3:
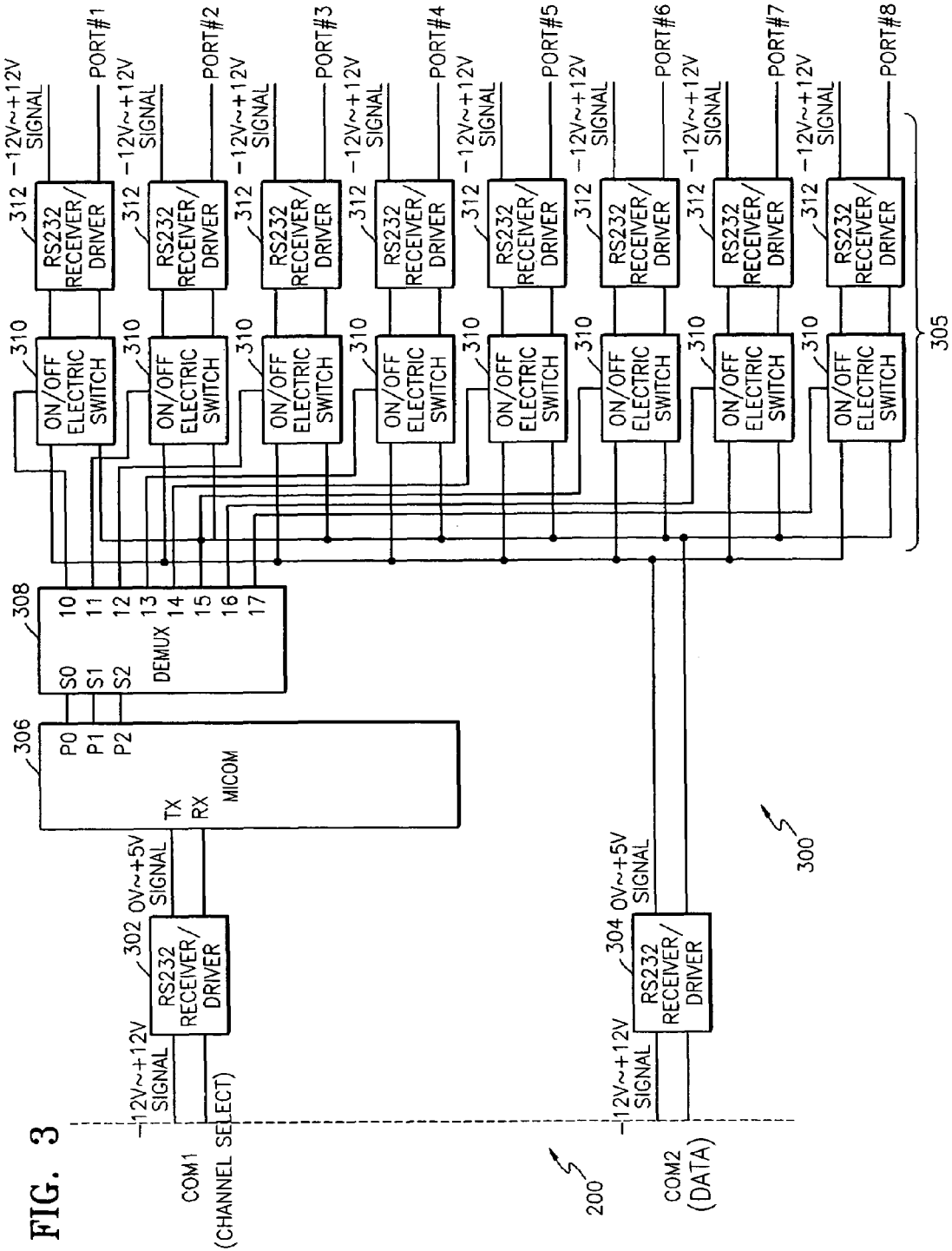
FIG. 3 is a block diagram showing a detailed structure of a serial communication multi-port apparatus, according to an embodiment of the present invention.

FIG. 3 is a block diagram showing a detailed structure of a serial communication multi-port apparatus, according to an embodiment of the present invention. Referring to FIG. 3, typically, a multi-port serial communication apparatus (device) or a multi-port serial multi-port serial communicator (switch) 300 comprises two RS-232 receiver/drivers 302 and 304 that convert the voltage levels (−12V∼+12V) of first and second serial communication signals output from the first and second serial communication ports (COM1 and COM2), respectively, of the host computer 200, into 1V∼+5V, which is the level of a transistor-transistor logic (TTL) signal of the multi-port serial communication device, and convert the voltage levels 0V∼+5V of the TTL output from a serial signal input/output unit 305 into the (−12V∼+12V) of the first and second serial communication ports (COM1 and COM2), respectively, of the host computer 200. The RS-232 receiver/drivers 302 and 304 comprise the first and second connection units of the multi-port serial communicator that are communicably connected with the host computer 200 COM1 and COM2 ports, respectively, and in the core of the present invention.

As an example, in case of communication from the host computer 200 to the plurality of the peripherals 1-5, one of the two serial communication signals from the host computer 200 standard COM1 and COM2 ports is provided to a micro computer or micro processor (micom) 306 of the multi-port serial communicator 300, and the other second serial communication signal is provided to port switches 310 of the serial signal input/output unit 305. Therefore, for example, inputs of the micom 306 can receive the first serial communication signal output from the first connector 302, which is connected to the COM 1 of the host computer 200, and inputs of the port switches 310 can receive the second serial communication signal output from the second connector 304, which is connected to the COM 2 of the host computer 200. The outputs of the port switches 310 of the serial signal input/output 305 are connected to output ports 312 (e.g., ports 1-8) corresponding to respective controlled peripheral apparatuses. These port switches 310 comprise the changeover switch of the multi-port serial communicator 300 in the core of the present invention. More particularly, the serial signal input/output unit 305 comprises the port switches 310 as a changeover switch, and the RS232 receivers/drivers 312 as the serial communication output ports.

The micom 306 interprets the channel exchange command provided by the host computer 200, and selects one of the port switches 310. The micom 306 comprises a channel control unit of the multi-port serial communicator 300 in the core of the present invention. The channel exchange command is sent by the first serial communication signal input from the host computer 200 COM 1 to the micom 306. This channel exchange command is interpreted by firmware of the micom 306, and converted into an input of DEMUX 308, and an output of DEMUX 308 is connected to the on/off terminal (port) switches 310 of each of the RS232 receiver/driver ports 312 to control transmission of the second serial communication signal from the host computer 200 COM 2 to each of the output ports 312 (ports #1∼#n). Here, the output ports 312 (ports #1∼#n) correspond to the peripheral apparatuses desired to be controlled (communicate with), respectively, and are recognized (identified) by their port numbers. More particularly, as shown in FIG. 3, the outputs from the port switches 310 are again amplified to the voltage level of −12V∼+12V by the RS-232 receiver/driver 312 as respective output ports (ports #1∼#n).

As shown in FIG. 3, to communicate with a peripheral apparatus connectable to the host computer 200 and desired to be controlled by using the multi-port serial communicator 300, typically, the host computer 200 provides a channel exchange command to the multi-port serial communicator 300 to connect to an output port (#1-#n) of the multi-port serial communicator 300 corresponding to the apparatus desired to be controlled. Therefore, according to the present invention, one of the serial ports provided by the host computer 200 is used as a channel/port select control line (i.e., channel/port selector) transmitting a channel exchange command, and the other serial port is used as a data line in data communication with the selected peripheral apparatus to be controlled.

FIG. 4 is a diagram showing a structure of a channel select command packet used in the multi-port serial communicator 300 of FIG. 3, according to an embodiment of the present invention. Assuming as an example that the first serial communication port (COM1) of the host computer 200 is used for a channel/port control line and the second serial communication port (COM2) is used for a data line, if the host computer 200 sends a channel exchange command complying with a predetermined protocol through the first serial communication port (COM1) to the multi-port serial communicator 300, the channel exchange command received by the multi-port serial communicator 300 is sent through the RS-232 receiver/driver 302, converted into the TTL signal level of 0V - +5V voltage, and sent to the UART input ports (Tx, Rx) of the micom 306. In the multi-port serial [communication apparatus] communicator 300 shown in FIG. 3, the RS-232 receiver/drivers 302, 304 are provided for signal conversion between a signal level for RS-232 communications and a TTL signal level for a normal integrated circuit (IC).

The micom 306 interprets the input channel exchange command from the host computer 200 via the first connector 302, extracts the number (port number) of an output port desired to be selected, and outputs the extracted port number to the micom 306 output port (P0∼P2). Also, if the micom 306 normally executes the channel exchange command, the micom 306 generates an ACK response signal to indicate the normal channel exchange command execution to the host computer 200, or else generates an NAK response signal to indicate that the channel exchange command is not correctly received, and transmits the ACK/NAK response signal to the host computer 200. These ACK/NAK response signals also use the data format as shown in FIG. 4. The port number which is output from the output port (P0∼P2) of the micom 306 is provided to the input ports (S0∼S3) of the DEMUX 308, and the DEMUX 308 only turns on a port switch 312 corresponding the output port number received via the DEMUX 308 input ports (S0∼S3).

Meanwhile, the second serial communication signal from the second serial communication port (COM2) of the host computer 200 is provided to all port switches 312 through the RS-232 receiver/driver 304. If one of the port switches 310 is turned on by the operation of DEMUX 308, the second serial communication signal passes through the turned on port switch 310, and through the corresponding RS-232 receiver/driver 312 as an output signal −12V~+12V of an output port corresponding to the apparatus desired to be controlled. That is, a communication channel is established between the host computer 200 and the peripheral apparatuses desired to be controlled via the multi-port serial communicator 300 communicably connected to the COM1 and COM2 ports of the host computer 200. The communications between the host computer 200 and the peripheral apparatus desired to be controlled is performed according to a protocol determined between the two, and therefore the multi-port serial communicator 300 shown in FIG. 3 is responsible for only selection and connection of an peripheral apparatus desired to be controlled, which is less complex than the related multi-port serial communication techniques requiring an interrupt manager and more costly UART controllers.

Figure 5:
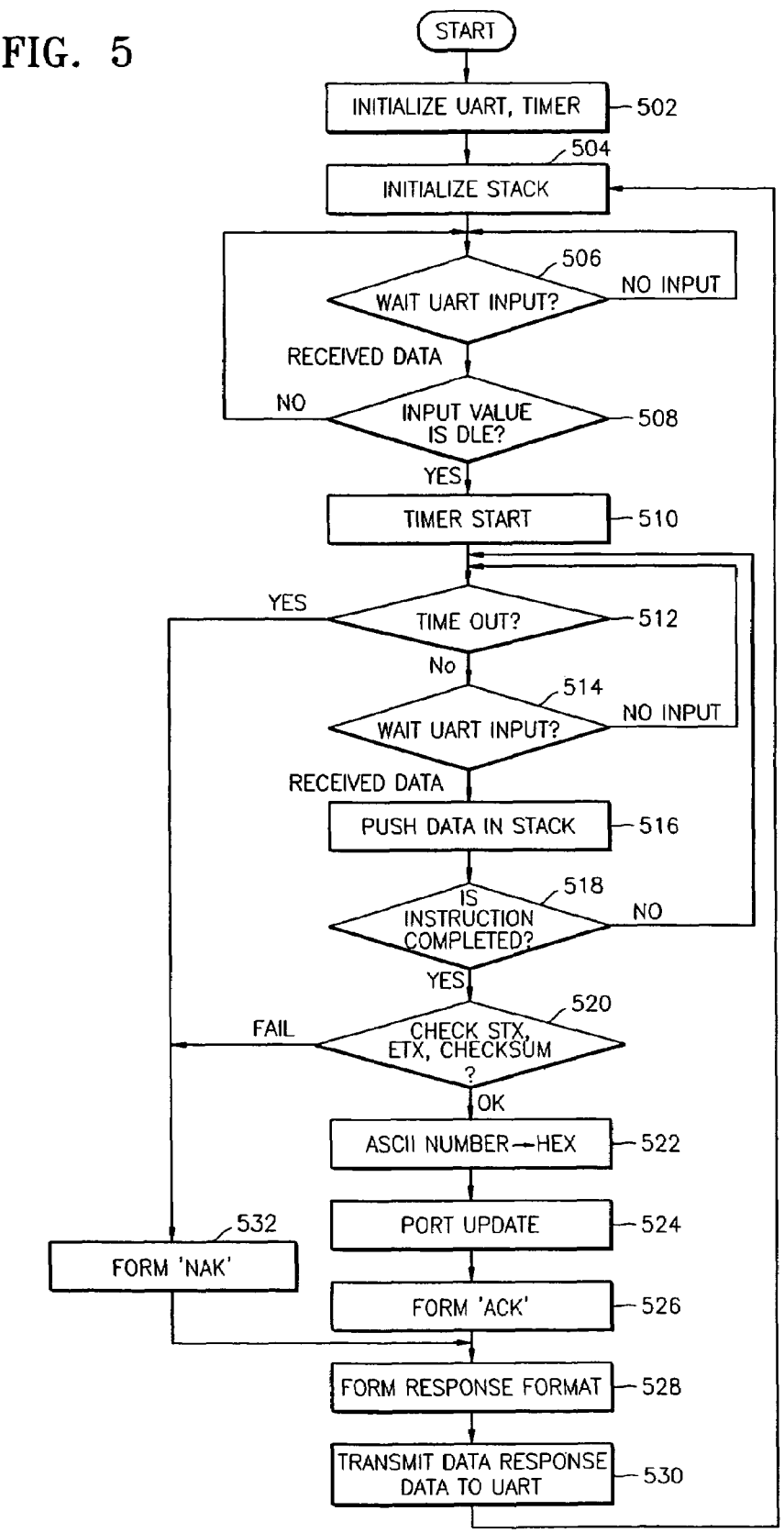
FIG. 5 is a flowchart of controlling the micom shown in FIG. 3, according to an embodiment of the present invention.

FIG. 5 is a flowchart of controlling the micom shown in FIG. 3, according to an embodiment of the present invention. Referring to FIG. 5, if operation power is provided to the multi-port serial communicator 300 shown in FIG. 3 and a firmware program to control the micom 306 is executed, at operations 502 and 504, initialization operations are first performed. More particularly, at operation 502, the UART communication speed and method of the micom 306 are adjusted to those of the host computer 200. Then, in operation 504, a stack is initialized. The stack is used as a place for temporarily storing a channel exchange command according to a protocol determined with the host computer 200, and whenever a channel exchange command is executed by the micom 306, the stack is newly initialized. If, at operations 502 and 504, all initialization is finished, at operation 506, the micom 306 waits for input of a channel exchange command from the host computer 200.

Referring back to FIG. 4, typically, a channel exchange command comprises 6 bytes of DLE, STX, Port Number(s), checksum, and ETX information. As described above, according to an aspect of the invention, the micom 306 receives/transmits data from/to the host computer 200 COM1 port via the RS232 receiver/driver 302 (first connector 302) connected to the COM1 port of the host computer 200 and the UART input ports (Tx, Rx) of the micom 306. If a first byte is input, at operation 508, the micom 306 checks whether the input value is a DLE indicating the start of a channel exchange command. If, at operation 508, the first input byte is not DLE, at operation 506, the micom 306 again waits for an input from the host computer 200. That is, before (until) a DLE is input, all inputs are treated as garbage. If, at operation 508, the input value is DLE indicating the start of a channel exchange command, at operation 510, a timer limiting the time of command completion starts. At operation 512, it is determined whether a time out has occurred according to the timer started at operation 508. At operations 514 through 518, the micom 306 waits for the input of the entire channel exchange command (6 bytes) within the allotted time. In particular, at operation 514, it is determined whether another byte has been input at the UART of the micom 306. At operation 516, an input byte is pushed on the stack in turn.

If the 6-byte data is not input during a predetermined command completion time, for example, for 36 ms, at operation 512, the timer indicates time-out. If, at operation 512, timeout is indicated, at operation 532, the micom 306 sends a NAK message to the host computer 200 indicating that the command was not correctly received. If, at operation 518, it is determined that the command input is completed within the predetermined time, at operation 520, the micom 306 checks whether the channel exchange command values of STX, ETX, and Checksum are correct, and if, at operation 520, there is an error, at operation 532, a NAK message is sent to the host computer 200. In particular, with reference to FIG. 4, for example, a 3-digit number is used to indicate ports; one number designated to each place. That is, num1 in the one (1) place, num2 in the tens (10) place, and num3 in the hundreds (100) place, are transmitted to the micom 306. Therefore, for example, if the port number is 123, num1-num3 will be 3, 2, and 1 respectively. Also, as shown in FIG. 4, a checksum is calculated by XORing num1, num2, and num3. If, at operation 520, it is confirmed that the channel exchange command STX, ETX and Checksum values are correct, at operation 522, the micom 306 converts an ASCII code port number (at least one, but may be two or more ASCII port numbers associated with the number of ports provided in the multi-port serial communicator 300) contained in the channel exchange command into a hexadecimal number. At operation 524, the micom 306 outputs the converted hexadecimal port number (s) to the output ports (P0-P2) of the micom 306 as a port update to the DEMUX 308 to select a port of the serial signal input/output unit 305. After, at operation 524, the channel exchange command is executed, at operations 526-530, the micom 306 prepares and sends an ACK message, via the micom 306 UART port (Tx, Rx) to the host computer 200 COM 1, the ACK message indicating that the channel/port is exchanged. Then, the micom 306 returns to the operation 504 and waits for a next command. Therefore, the micom 306 converts the input channel select port number(s) from ASCII into hexadecimal and maps each port number into the output ports P0-P2 of the micom 306. In particular, the number of the micom 306 output ports P0-Pn), including the input ports (S0-Sn) of the DEMUX 308, is a function of the number of desired serial ports of the serial signal input/output unit 305. The multiple port number designation in the input channel select command allows communications in order with multiple apparatuses connected to the serial signal input/output unit 305 serial ports.

As explained referring to FIGS. 3 through 5, the multi-port serial communicator 300 does not form and use new integrated serial ports in the host computer 200 to be coupled with respective apparatuses, but provides serial communication signals, which are provided by the existing two serial communication ports of the host computer, to a plurality of peripheral apparatuses. Accordingly, the switch according to the present invention does not need installation of a separate conventional driver software to drive a device via one of the ports of the multi-port serial communicator 300, and can control a plurality of apparatuses at a low cost. In other words, installation of a plurality of driver software for a plurality of serial ports is not memory efficient, whereas the present invention uses the existing driver software driving the existing two serial ports.

Also, the multi-port serial communicator 300 does not use a board shape inserted into a slot of a computer main board, and is generally manufactured as a peripheral apparatus and used by being connected to the serial ports that are provided with a computer. Accordingly, the installation and detachment are convenient. In addition, the multi-port serial communicator 300 does not add a serial communication controller to each of the ports which the multi-port serial communicator 300 supports, but connects to each port by switching the output of one serial communication controller (e.g., COM2) to a desired port. Accordingly, the multi-port serial communicator 300 reduces the cost of port addition when ports are added, and prevents the port structure from being more complex, because additional serial communication controllers are not added. Also, by using two serial ports that are basically provided with a computer, the multi-port serial communicator 300 allows developing application programs without a special driver or library.

As described above, the serial communication multi-port serial communicator 300 according to the present invention provides a method of controlling a plurality of computer peripheral apparatuses using the computer existing serial communications in a simple and inexpensive way. In addition, the serial communication multi-port apparatus according to the present invention has a minimum installation requirement by only requiring standard cable connection(s) to the external serial ports that is generally provided with a host computer.

Also, the serial communication multi-port apparatus according to the present invention does not use data conversion for serial communication in the ISA/PCI slot, but uses direct connection of serial ports of the host computer to communicate with a plurality of peripheral apparatuses desired to be controlled, such that there is no inconvenience that driver software should be produced and installed for each operating system. Although, the above-described example embodiment expands the serial ports of the computer to eight serial ports as shown in FIG. 3, the present invention is not limited to such a configuration, and the multi-port serial communicator 300 may be implemented to provide any number of serial ports. Meanwhile, the serial communication multi-port apparatus according to the present invention uses only basic functions of an operating system and a simple port selection protocol, such that efforts to learn usage of the multi-port apparatus are less burdensome to an application software developer. Typically, the port selection protocol is implemented in software in an application program that can communicate via the computer COM1 and COM2 ports.

In addition, the serial communication multi-port apparatus according to the present invention can be implemented with any host having any embedded system that supports serial communications, as well as typical computers having two serial communication ports. Furthermore, since the serial communication multi-port apparatus according to the present invention can expand ports of a host computer only by adding (communicably connecting) an electronic switch to the host ports, the multi-port apparatus accommodates controlling (communicating with) many computer peripheral apparatuses at an inexpensive cost.

Accordingly, the present invention provides a multi-port serial communication switch (device) used to communicably connect for data communication a computer with a plurality of peripheral apparatuses connected to the computer through the computer serial communication ports. More particularly, the multi-port serial communication switch communicably connects the computer with the plurality of peripheral apparatuses through two serial communication ports mounted in the computer. A second serial communication port of the computer is connectable to peripheral ports corresponding to the plurality of peripheral apparatuses desired to communicate with. A changeover switch is controlled through a first serial communication port of the computer to select one of the plurality of the peripheral apparatuses to connect with the second serial communication port of the computer and to communicate with the one peripheral apparatus through the second serial communication port. The multi-port serial communicator 300 may be implemented in computing software and/or computing hardware and is provided as a peripheral device with respect to a host computer. A peripheral apparatus can be any computing apparatus in addition to the host computer, such as another computer, hard disk drive testers, printers, hand-held computing devices, etc. Furthermore, the multi-port serial communicator 300 may be integrated with or included in a peripheral apparatus, if, for example, the peripheral apparatus comprises a plurality of peripheral apparatuses.

Therefore, the present invention may be implemented as a method, an apparatus, a computer system and the like. When it is implemented as software, the elements of the present invention are code segments executing the above-describe processes of the present invention. The program or code segments may be stored in a processor readable recording medium. The processor readable recording medium includes electronic circuits, semiconductor memory devices. ROMs, flash memories, erasable ROM (EROM), floppy discs, optical discs and hard discs. The present invention may be transmitted in a computer data signal coupled with a carrier wave in a transmission medium or in a communications network. Transmission medium includes optical fiber media, radio frequency networks, and the like. The computer data signal includes any signals that can be transmitted over the transmission media such as electronic network channels, the air, electronic field, radio frequency networks, and the like.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of serially communicating data between a computer and a plurality of peripheral apparatuses via a corresponding plurality of target serial ports, the method comprising:

controlling a changeover switch through a first serial communication port of the computer, the first serial communication port acting primarily as a channel/port selector transmitting a channel exchange command;

connecting a second serial communication port of the computer to one of the target serial ports corresponding to a peripheral apparatus desired to be communicated with, according to the controlling of the changeover switch, the second serial communication port acting primarily as a data line in data communication with the peripheral apparatus desired to be communicated with; and communicating with the desired peripheral apparatus through the second serial communication port of the computer and the one target serial port.

2. The method of claim 1, wherein the changeover switch controlling comprises transmitting a channel exchange command, which complies with a predetermined protocol and contains a port number indicating the one target serial port, to the changeover switch through the first serial communication port of the computer, and wherein the changeover switch operates according to a process comprising:

interpreting the channel exchange command, extracting the port number, connecting the one target serial port, corresponding to the extracted port number, to the second serial communication port of the computer, generating a response signal indicating that the one target serial port corresponding to the port number is connected to the second serial communication port of the computer, and transmitting the response signal to the computer through the first serial communication port of the computer.

3. A multi-port serial communication apparatus communicably connectable with first and second serial communication ports of a computer, the apparatus comprising:
- a first connector connectable to the first serial communication port of the computer and primarily receiving channel exchange commands from the first serial communication port acting as a channel/port selector;
- a second connector connectable to the second serial communication port acting primarily as a data line in data communication with a peripheral apparatus desired to be communicated with;
- a plurality of input/output serial ports connectable to a plurality of peripheral apparatuses;
- a hardware changeover switch selectively switching the second connector to communicably connect with one of the input/output serial ports; and
- a channel control processor connected to the first connector and controlling the changeover switch switching, according to an input from the first serial communication port of the computer via the first connector, to selectively switch the second connector to the one input/output serial port.

4. The apparatus of claim 3, wherein the serial communication ports of the computer are RS-232 communication ports.

5. The apparatus of claim 3, wherein:
- the first connector comprises a first RS-232 receiver/driver disposed between the first serial communication port of the computer and the channel control processor and that converts a signal level of the first serial communication port RS-232 into a TTL signal level of the channel control processor and vice versa, and
- the second connector comprises a second RS-232 receiver/driver disposed between the second serial communication port of the computer and the changeover-switch and that converts a signal level of the second serial communication port RS-232 into a TTL signal level of the changeover switch and vice versa.

6. The apparatus of claim 3, wherein the channel control processor receives a channel exchange command complying with a predetermined protocol as the input from the first serial communication port of the computer via the first connector.

7. The apparatus of claim 6, wherein the channel control processor transmits a response signal through the first connector to the first serial communication port of the computer after processing the channel exchange command.

8. A method of controlling a multi-port serial communication apparatus communicably connectable to a computer and comprising first and second connectors communicably connectable to a first serial communication port and a second serial communication port, respectively, of the computer, a plurality of input/output serial ports connectable to a plurality of peripheral apparatuses, a changeover switch selectively switching the second connector to one of the input/output serial ports and a channel control processor connected to the first connector and controlling the changeover switch switching to the one input/output serial port, the method comprising:
- if operation power is provided to the multi-port serial communication apparatus, adjusting a serial communication speed and a method of the channel control processor to those of the computer;
- receiving a channel exchange command from the first serial communication port of the computer through the first connector, the first serial communication port acting primarily as a channel/port selector;
- controlling the changeover switch according to the received channel exchange command; and
- transmitting a response signal indicating a successful switching, to the second serial communication port of the computer through the second connector.

9. A processor readable recording medium storing at least one program controlling a multi-port serial communication apparatus, which is communicably connectable to a computer and includes first and second connectors communicably connectable to a first serial communication port and a second serial communication port, respectively, of the computer, a plurality of input/output serial ports connectable to a plurality of peripheral apparatuses, a changeover switch selectively switching the second connector to one of the input/output serial ports and a channel control processor connected to the first connector and controlling the changeover switch switching to the one input/output serial port, wherein, the at least one program when executed performs a process comprising:
- if operation power is provided to the multi-port serial communication apparatus, adjusting a serial communication speed and a method of the channel control processor to those of the computer;
- receiving a channel exchange command from the first serial communication port of computer through the first connector, the first serial communication port acting primarily as a channel/port selector;
- controlling the changeover switch according to the received channel exchange command; and
- transmitting a response signal indicating a successful switching, to the second serial communication port of the computer through the second connector.

10. The method of claim 1 wherein the changeover switch controlling comprises transmitting a channel exchange command, which complies with a predetermined protocol and contains a port number indicating the one target serial port, to the changeover switch through the first serial communication port of the computer, and wherein the changeover switch operates according to a process comprising:
- if operation power is provided to the changeover switch, adjusting a serial communication speed of a changeover switch serial communication port and a method of a channel control processor to those of the computer;
- receiving a channel exchange command from the first serial communication port of computer through the changeover switch serial port;
- interpreting the channel exchange command,
- extracting the port number corresponding to the one target serial port,
- connecting the one target serial port, corresponding to the extracted port number, to the second serial communication port of the computer,
- generating a response signal indicating that the one target serial port corresponding to the port number is connected to the second serial communication port of the computer, and
- transmitting the response signal to the computer through changeover switch serial port and the first serial communication port of the computer.

11. A multi-port serial communication switch communicably connectable with first and second serial communication ports of a computer, the switch comprising:
- a first hardware switch connector connected to the first serial communication port acting primarily as a channel/port selector transmitting a channel exchange command and a second switch connector connected to the second serial communication port acting primarily as a data line in data communication with a peripheral apparatus desired to be communicated with;

and a serial port selector connected to the first switch connector and controlling selection of one of a plurality of input/output serial ports to communicably connect with the second switch connector, according to a serial port exchange command input from the first serial communication port of the computer via the first switch connector.

12. The switch of claim 11, wherein the first and second switch connectors are a first and second RS-232 receiver/drivers connectable to the first and second serial communication ports of the computer; and wherein the serial port selector comprises:
- a programmed computer processor receiving the serial port exchange command input from the first serial communication port of the computer via the first RS232 receiver/driver, extracting a serial port number corresponding to one of the plurality of input/output serial ports from the serial port exchange command, and outputting a extracted serial port number,
- a demultiplexer receiving the converted serial port number to output a serial port selection signal according to the serial port number to selected one of the input/output serial ports,
- a plurality of on/off electric port switches disposed between the second RS232 receiver/driver and a plurality of third RS232 reciever/drivers as the plurality of input/output serial ports, each on/off electric port switch switched on according the demultiplexer serial port selection signal to connect a corresponding third RS232 receiver/driver as the selected input/output serial port and the second RS232 receiver driver and establish a serial communication channel among the second RS232 port of the computer, the second RS232 receiver/driver and the corresponding third RS232 receiver driver.

13. A multi-port serial communication switch, comprising:

circuitry communicably connectable to a first serial communication port of a computer acting primarily as a channel/port selector transmitting a channel exchange command to establish a serial port selection channel according to the computer control to selectively communicably connect a second serial port of the computer with one of a plurality of input/output serial ports of the switch, the second serial port acting primarily as a data line.

14. A network computer system, comprising:

a computer having a first serial communication port acting primarily as a channel/port selector transmitting a channel exchange command and a second serial communication port acting primarily as a data line in data communication with the peripheral apparatus desired to be communicated with;

a plurality of peripheral apparatuses, each with serial ports; and a multi-port serial communication switch communicably connectable with the first and second serial communication ports of the computer and with the serial communication ports of the plurality of peripheral apparatuses, the switch comprising:
- a first connector and a second connector connectable to the first serial communication port and the second serial communication port, respectively, of the computer;
- three or more input/output serial ports connectable to the plurality of peripheral apparatuses; and
- a serial port selector connected to the first connector and controlling selection of the second connector to communicably connect with one of the input/output serial ports to connect to a corresponding serial port of one of the peripheral apparatuses, according to a port selection command input from the first serial communication port of the computer via the first connector.

* * * * *

UNITED STATES PATENT AND TRADEMARK OFFICE
CERTIFICATE OF CORRECTION

PATENT NO. : 7,401,168 B2 Page 1 of 1
APPLICATION NO. : 10/845116
DATED : July 15, 2008
INVENTOR(S) : Sung-uk Moon et al.

It is certified that error appears in the above-identified patent and that said Letters Patent is hereby corrected as shown below:

Column 12, Line 34, after "claim 1" insert --,--.

Column 13, Line 30, change "reciever" to --receiver--.

Column 13, Line 32, after "according" insert --to--.

Column 13, Line 35, change "receiver driver" to --receiver/driver--.

Column 13, Line 39, change "receiver driver." to --receiver/driver.--.

Signed and Sealed this

Fourth Day of November, 2008

JON W. DUDAS
*Director of the United States Patent and Trademark Office*